3,391,221
FLUOROCARBON POLYMER MOLDING
COMPOSITIONS
Wilbert Lee Gore and Robert Walton Gore, Newark, Del., assignors to W. L. Gore & Assoc., Inc., Newark, Del., a corporation of Delaware
No Drawing. Filed Sept. 21, 1964, Ser. No. 398,068
9 Claims. (Cl. 260—857)

ABSTRACT OF THE DISCLOSURE

Fluorocarbon polymer molding compositions having imporved low shrinkage properties are obtained by compositions of such fluorocarbon polymers containing permanent lubricant-modifiers selected from the class consisting of (a) non-volatile liquids which remain thermally stable and liquid at the sintering temperatures of the fluorocarbon polymer and have low vapor pressures at these temperatures and (b) materials which are liquid during the forming of the fluorocarbon polymer article and are transformed into a solid in the final shaped article, which materials are thermally stable at the sintering temperature of the fluorocarbon polymer.

---

This invention relates to fluorocarbon polymer molding compositions and more particularly to fluorocarbon polymer compositions containing certain additives giving rise to novel and unique results when such compositions are shaped.

When polytetrafluoroethylene or a similar fluorocarbon polymer is formed by processes which involve the use of an organic lubricant, such as described in U.S. Patent 2,685,707 issued Aug. 10, 1954, to Llewellyn and Lontz and in co-pending application Ser. No. 181,295 filed Mar. 21, 1962, by one of us now U.S. Patent 3,315,020, the removal of the volatile lubricant prior to sintering the formed shape leaves the material in a spongy state containing from 15 to 50 volume percent voids. Some shrinkage occurs during the drying operation. When the shaped article is sintered, the material coalesces and forms a homogeneous mass that is essentially free of these voids. However, the closing of the voids left from the volatilization of the lubricant leads to a volume shrinkage equal approximately to the volume of voids in the material. This shrinkage makes it difficult to manufacture molded articles to precise dimensions. Even allowances in mold dimensions for shrinkages expected during the subsequent closure of the voids do not assure a precisely dimensioned article since the shrinkage may not be uniform along all axes and thus may result in serious distortions.

In copending application Ser. No. 4,070, now U.S. Patent 3,150,207 one of us has described an invention for improving the resistance of polytetrafluoroethylene polymers to attack by electrical corona discharges. In one embodiment of that invention, high boiling, thermally stable fluids are distributed uniformly throughout the polymers and the mixture is then sintered. During the sintering the fluid is trapped in the coalesced polymer and sealed there in the form of very small droplets evenly distributed throughout the mass. In our present invention, however, lubricants are employed not necessarily to achieve corona resistance but to achieve the molding or forming of precisely dimensioned articles.

It is, therefore, an object of the present invention to provide novel fluorocarbon polymer compositions. It is a further object of the present inventioin to provide fluorocarbon polymer compositions which can be molded to precisely dimensioned shapes. It is still another object of the present invention to provide fluorocarbon polymer compositions that have unique and valuable properties such as rigidity, high elongation, resiliency, lubricity, and resistance to high temperatures. A further object of the present invention is to provide fluorocarbon polymer compositions which even though they may result in some shrinkage during the fabrication thereof are free from distortion. Other objects will become apparent hereinafter.

In accordance with the present invention, it was discovered that compositions containing from about 10 to 55 volume percent of a uniformly distributed permanent lubricant-modifier selected from the class consisting of (a) non-volatile liquids which remain thermally stable and liquid at the sintering temperatures of the fluorocarbon polymer and have low vapor pressures at these temperatures (Type I lubricant-modifiers), and (b) materials which are liquid during the forming of the fluorocarbon polymer article and are transformed into a solid in the final shaped article, which materials are thermally stable at the sintering temperatures of the fluorocarbon polymer (Type II lubricant modifiers) produce shaped articles on sintering which correspond very closely to the dimensions of the mold and have improved properties.

The compositions of the present invention are fabricated by processes involving the mixing of powdered fluorocarbon polymer and the lubricant-modifier, the shaping or forming of the resulting mixture under pressure, followed by the free-sintering of the shaped article, i.e., heating the shaped article to a temperature above its melting or coalescing point without the application of pressure. The blending, shaping, and sintering steps involved in fabricating the compositions of the present invention are generally known to those skilled in the art. In the blending and/or shaping of the fluorocarbon polymer with the lubricant-modifiers of the present invention, it may be necessary to employ a suitable volatile diluent for lubricant-modifiers which exceed the generally satisfactory viscosity range of 0.5 to 20,000 centipoises. The addition of the diluent to the lubricant modifier having viscosities in excess of 20,000 centipoises assures the uniform distribution of the lubricant-modifier in the fluorocarbon polymer and allows the lubricant-modifier to function properly as a lubricating agent during the shaping operation. The volatile diluent employed is generally one that can be removed through heating at temperatures below the sintering temperature of the fluorocarbon polymer involved. If such diluent is employed, the diluent is removed prior to sintering of the fluorocarbon composition to prevent the diluent from interfering in the sintering operations.

If the volume of the diluent added exceeds the volume of acceptable shrinkage either from a standpoint of maintaining the precise dimensions or from a standpoint of preventing distortion, it may be necessary to divide the shaping operation into two (2) steps in which the fluorocarbon polymer is formed to the general shape desired, the volatile diluent then evaporated and the shaped article reshaped to the precise dimensions desired. The content of the lubricant-modifier stated above is based on the content of the lubricant-modifier in the finally shaped article before the sintering operation. This content will generally correspond to the content of the lubricant-modifier in the sintered composition although, depending on the degree of dimensional accuracy desired, some volatile diluents such as do not result in volume shrinkages in excess of 4 to 10 percent can be present in the unsintered composition. This is particularly true of the Type II lubricant-modifiers which give rise to many additional advantages as described hereinafter in greater detail when employed in the compositions of the present invention, and thus with these compositions the content of volatile diluents is not as critical.

In some instances it may even be desirable to have present a small concentration of volatile diluent in the shaped unsintered article. Many fluorocarbon polymers, such as polytetrafluoroethylene are formed as highly crystalline materials. Some of this crystallinity is lost in the fabrication of the polymer. The reduction in crystallinity results in a lower density material and thus in an increase in volume. The addition of sufficient volatile diluent to the compositions of the present invention to offset the increase in volume resulting from the decrease in crystallinity is therefore highly desirable where the finished article is to correspond precisely to the dimensions of the mold.

The fluorocarbon polymers employed in the compositions of the present invention are those which the prevailing substituents on the polymer chain are fluorine, or perfluorinated radicals and which can be fabricated by the aforesaid methods of powder forming and free-sintering. Examples of the fluorocarbon polymers useful in the present invention are polytetrafluoroethylene, polychlorotrifluoroethylene and hexafluoropropylene. The preferred fluorocarbon polymer is polytetrafluoroethylene. This polying with the lubricant-modifiers of the present invention.

The Type I lubricant-modifiers of the present invention are non-reactive fluids that remain liquid in the final shaped article. Examples of this material are liquid polysiloxanes such as methyl silicone oils, phenyl methyl silicone oils, and silicone oils containing halogen substituted side groups; perfluorinated liquids such as perfluorinated kerosene; and high boiling partially halogenated liquids such as pyromellitic esters of fluorinated alcohols. As indicated above, the lubricant-modifiers of the present invention need not have good electrical properties.

The Type II lubricant-modifiers of the present invention are liquids during the forming of the article but are transformed into solids in the final composition. The Type II lubricant-modifiers of the present invention are greatly preferred in the use of the present invention, since the articles obtained from these compositions not only are reduced in shrinkage and are free from distortion which is also achieved with the Type I lubricant-modifiers; but, furthermore, the Type II lubricant-modifiers result in improvement in the properties of the shaped article which is due in part to the properties of the Type II lubricant-modifier and also in part due to the manner in which these lubricant-modifiers are incorporated into the shaped sintered article, i.e., the transformation of the lubricant-modifier from a liquid to a solid during the fabrication of the article.

This transformation can be accomplished in a number of ways. The lubricant may be a liquid monomer or liquid prepolymer which is polymerized into a solid in the sintering operation of the fluorocarbon polymer. This solidification may occur as the polymer is heated to its sintering temperature after having been shaped or at the sintering temperature. The Type II lubricant-modifier may also be a solution of a liquid or solid material such as an inorganic salt, a polymer or a prepolymer. If the solvent is volatile at the sintering temperature, it is removed as herein above indicated leaving the inorganic salt, polymer, or prepolymer uniformly dispersed throughout the molded article. The lubricant-modifier may also be a solid that melts at an elevated temperature but below the sintering temperature of the fluorocarbon polymer. With such a type of lubricant-modifier, the article is formed above the melting temperature of the lubricant. Finally, the lubricant can be a dispersion of a solid material in a liquid. If the liquid is volatile, it is evaporated prior to sintering leaving the solid uniformly distributed throughout the polytetrafluoroethylene article.

Of the Type II lubricant-modifiers which are liquids during the forming of the article but are transformed into solids in the final compositions, those in which the transformation to the solid stage is the result of a chemical reaction, e.g., polymerization are preferred. Such compositions comprise in particular polymers having a high percentage of aromatic rings in the polymer chain, i.e., at least one aromatic ring in each repeating unit. Such polymers are the aromatic polyamides formed by the reaction of aromatic dicarboxylic acids such as terephthalic acid, with aromatic amines such as phenyl diamine or biphenyl diamine; the aromatic polyimides formed by the reaction of such acid dianhydrides as pyromellitic dianhydride with the stated aromatic diamine; the polyamide, polyimide copolymers formed from the above named components; aromatic polyesters formed from aromatic dicarboxylic acids and aromatic diols; polybenzimidazoles formed from aromatic tetracarboxylic acids such as pyromellitic acid and aromatic tetramines; aromatic polyethers; and Novolac epoxy resins such as the commercially available Dow epoxy resins.

The degree of polymerization occurring in the compositions of the present invention when transformed from the unsintered state to the final state is not critical so long as the increase in the molecular weight transforms the monomer or prepolymer into a hard, thermally stable substance.

One function of the lubricant-modifier of the present invention is to provide an ease of flow of the fluorocarbon polymer so that it can be molded or extruded into complex shapes. A further function is to reduce or eliminate the shrinkage that occurs as a consequence of the removal of a volatile lubricant. Another very important function of these lubricants is the provision of special and valuable properties in the intimately blended compositions they form with the fluorocarbon polymer. For example, a phenyl silicone lubricant provides a composition of improved flexibility and one which also has high lubricity under high unit loadings. All of the lubricant-modifiers which are transformed into solids in the final composition contribute increased resistance to plastic flow and improved rigidity. The compositions containing the aforesaid aromatic polymers such as the polyimides have an unusual resiliency as well as high rigidity and hardness.

The compositions of the present invention, which contain the polymerizable monomers and prepolymers, result in useful articles without going through the described sintering operation. Unsintered polytetrafluoroethylene sheeting, biaxially fibrillated as described in copending application Ser. No. 181,295 of one of us now U.S. Patent 3,315,020, can be processed using as lubricant the described monomers or prepolymers. The lubricant is polymerized in situ by heating the sheet to a temperature below the sintering temperature of polytetrafluoroethylene. The resulting sheet or article molded from the sheet prior to heating is tough, rigid, and has a low coefficient of friction. Although such articles are useful, usually they will be sintered as the strength is improved by the sintering.

This invention will be further understood by reference to the examples below which are given by way of illustration and are not limitative.

Example I

A split die was made up for a #10 machine screw, 32 threads per inch, 0.5 inch thread length. The polytetrafluoroethylene molding compositions were forced into the die cavity from the head end and flowed down into the threaded region. The moldings were removed by opening the two halves of the die where it was split along the longitudinal axis of the screw.

Dry polytetrafluoroethylene molding powder was forced into the die cavity. Although high pressure was applied, when the die was opened it was found that the polytetrafluoroethylene had not filled the thin regions of the thread, and an unsatisfactory molding was obtained.

Polytetrafluoroethylene fine powder, commercially available under the trademark "Teflon" 6, was blended with a light hydrocarbon oil in the amount of 105 cc. per pound of polytetrafluoroethylene. The lubricated composition flowed well into the die cavity. The screw was removed from the die and the volatile lubricant was evaporated off. During the drying process, the screw shrank 5 to 15 percent along its various dimensions as the voids left by the evaporated lubricant partially closed. The screw was then placed in an oven maintained at 380° C. for a period of five (5) minutes. Further void closure and shrinkage occurred during the sintering bringing the total volume shrinkage to 33 percent.

Example II

The polytetrafluoroethylene fine powder of Example I was lubricated with a high boiling silicone fluid commercially available as Dow Corning 550 Fluid, in the amount of 80 cc. per pound of polytetrafluoroethylene. The lubricated composition flowed readily into the screw die cavity. No drying step was employed and the preformed screw was sintered as set forth in Example I. A measurement of the dimensions after sintering showed a net 2 percent increase in volume due apparently to the usual decrease in crystallinity and increase in specific volume of sintered polytetrafluoroethylene.

Example III

The polytetrafluoroethylene fine powder of Example I was lubricated with a mixture of 70 cc. of the silicone fluid of Example II and 10 cc. of the light hydrocarbon oil of Example I. The lubricated composition flowed readily into the screw die cavity. After molding, the small amount of volatile hydrocarbon was evaporated off and the screw was sintered. It was found that the sintered screw occupied exactly the same volume as the original molding, indicating that a balance had been established between the tendency of the polytetrafluoroethylene to shrink into voids left by the volatile lubricant and the natural increase of the specific volume of sintered polytetrafluoroethylene.

Example IV

Polytetrafluoroethylene fine powder of Example I was mixed with 20 percent dry weight of potassium thiocyanate (M.P. 173° C.). The mixture was heated to 200° C. and forced into the screw die. The composition filled the die readily. The molding was removed from the die and sintered at 350° C. The volume did not change appreciably as a result of the sintering.

Example V

The polytetrafluoroethylene fine powder of Example I was lubricated with 105 cc. of ethyl alcohol containing 40 weight percent of barium perchlorate dissolved in it. Some of the mixture was forced into the screw cavity. The molded screw was removed from the die, dried at 100° C. for one hour and then sintered at 380° C. The total volume shrinkage was 22 percent as compared to 33 percent obtained with the lubricated composition of Example I.

Example VI

A polyimide prepolymer (pyromellitic dianhydride plus phenyl diamine) in the form of a 40 percent solution in N - methyl - 2 - pyrrolidone (commercially available as RCW98708) was mixed with polytetrafluoroethylene in the proportion of 120 cc. of prepolymer per pound of polytetrafluoroethylene. This composition was formed into a sheet of biaxially fibrillated material following the procedure of Example I in copending application Ser. No. 181,295. A portion of the extruded ribbon was forced into the screw cavity, dried at 200° C. for three (3) hours and then sintered at 380° C. The total volume shrinkage was 20 percent.

A portion of the extruded ribbon was dried at 200° C. for two (2) hours and then rolled to compress the voids formed when the solvent evaporated. A portion of this rolled sheet was heated at 250° C. for three (3) hours to complete the cure of the polyimide. The resulting sheet was hard and tough and had a stiffness modulus of 100,000 p.s.i. as compared to about 60,000 p.s.i. for unmodified sintered polytetrafluoroethylene, despite the fact that the polytetrafluoroethylene had not been sintered.

A second portion of the rolled sheet was sintered at 380° C. The dimensions of the sheet remained substantially unchanged by the sintering operation. The stiffness modulus of this material was 200,000 p.s.i. and the elongation over 100 percent at break. The sintered sheet was observed to have a springy resiliency not found in other polytetrafluoroethylene compositions.

Example VII

Polytetrafluoroethylene powder and asbestos fibers were mixed in a weight ratio of 5 to 1. The mixture was lubricated with 120 cc. of polyimide prepolymer per pound of mixture and formed into biaxially fibrillated sheet. The sheet was heated at 200° C. for two (2) hours to evaporate volatile solvents and polymerize the polyimide. The temperature was then raised to 380° C. to sinter the polytetrafluoroethylene. The resulting sheet was found to be appreciably stiffer and more resilient than composition of polytetrafluoroethylene asbestos without the polyimide lubricant-filler. The stiffness modulus of the sheet was 250,000 p.s.i. compared to about 130,000 p.s.i. for similar sheets formed without the polyimide lubricant modifier.

Example VIII

A mixture of a "Novolac" epoxy resin, commercially available as Dow DEN 438, with 10 percent of pyromellitic dianhydride was dissolved in hot toluene, and blended with polytetrafluoroethylene to give a mixture combining 100 g. of the epoxy composition per pound of polytetrafluoroethylene. The toluene was then evaporated. The resultant polytetrafluoroethylene composition was heated to about 100° C. to render the epoxy lubricant-modifier adequately fluid and then forced into the screw die. The molding, which was well formed, was sintered at 380° C. and gave a tough, hard molding having a low coefficient of friction and showed no apparent shrinkage.

Example IX

The polytetrafluoroethylene fine powder of Example I was mixed with powdered silica to result in a composition containing 20 percent by weight of silica based on the mixture. The mixture was lubricated with 105 cc. of a light hydrocarbon oil per pound of polytetrafluoroethylene. It was found that the flow of material into the die was seriously inhibited by the presence of the silica. As a result, the screw was poorly formed.

The polytetrafluoroethylene fine powder of Example I was lubricated with 110 cc. of a colloidal dispersion of silica in water (commercially available as "Ludox") containing a small amount of "Triton 100–X" a commercially available detergent as a wetting agent. The so prepared composition readily flowed into the screw die. The resulting molding was dried and sintered at 380° C. The finished molding was found to have a high stiffness and a good resistance to plastic flow as compared to a molding obtained with unmodified polytetrafluoroethylene. The volume shrinkage was 20 percent as compared to 33 percent obtained from the lubricated composition of Example I.

It is to be realized that the foregoing specific illustrations of the formation and use of the compositions of the present invention are only illustrative of the scope of the present invention. The same methods described in these examples may also be employed in the formation and use of other compositions falling within the scope of the present invention as set forth hereinabove.

It is further apparent that many widely different embodiments of this invention can be made without departing from the spirit and scope thereof; and, therefore, it is not intended to be limited except as defined in the appended claims.

We claim:
1. A fluorocarbon polymer molding composition capable of powder forming and free sintering comprising polytetrafluoroethylene containing from 10 to 55 volume percent of a lubricant modified consisting essentially of a material which is a polymerizable liquid having a viscosity of 0.5 to 20,000 centipoises during the forming operation, and which is polymerized to a solid during the heating subsequent to forming of the molding composition, said lubricant modifier contributing increased resistance to plastic flow and improved rigidity to the fluorocarbon polymer composition.
2. The composition of claim 1, wherein the lubricant-modifier is a polymerizable liquid resulting in a prevailingly aromatic ring containing polymer chain.
3. The composition of claim 2, wherein the lubricant-modifier is a solid polyimide forming composition.
4. The composition of claim 2, wherein the lubricant-modifier is a solid polyether forming composition.
5. The composition of claim 2, wherein the lubricant is a solid polyamide forming composition.
6. The fluorocarbon polymer molding composition of claim 1 wherein the polymerizable liquid is a prepolymer of an aromatic dicarboxylic acid and an aromatic diamine in liquid form.
7. The fluorocarbon polymer molding composition of claim 1 wherein the polymerizable liquid is a prepolymer of an aromatic diamine and pyromellitic dianhydride in liquid form.
8. The fluorocarbon polymer molding composition of claim 1 wherein the polymerizable liquid is a prepolymer of an aromatic tetramine and pyromellitic dianhydride in liquid form.
9. A polytetrafluoroethylene article obtained by powder forming and free sintering the composition of claim 1.

References Cited

UNITED STATES PATENTS

| | | | |
|---|---|---|---|
| 2,940,947 | 6/1960 | Welch et al. | 260—29.1 |
| 3,005,795 | 10/1961 | Busse et al. | |
| 3,019,206 | 1/1962 | Robb. | |
| 3,037,948 | 6/1962 | Landler et al. | |
| 3,105,827 | 10/1963 | Kaufmann. | |
| 3,150,207 | 9/1964 | Gore | 260—827 |
| 3,156,666 | 11/1964 | Pruett. | |
| 3,190,864 | 6/1965 | Shipp et al. | 264—127 |
| 3,207,825 | 9/1965 | Tully | 264—127 |
| 3,287,288 | 11/1966 | Reiling. | |
| 3,356,760 | 12/1967 | Matray. | |

FOREIGN PATENTS

| | | |
|---|---|---|
| 696,321 | 8/1953 | Great Britain. |
| 1,045,824 | 12/1953 | France. |
| 1,143,126 | 9/1957 | France. |
| 1,214,372 | 4/1960 | France. |
| 1,342,434 | 9/1963 | France. |

ALLAN LIEBERMAN, *Primary Examiner.*

UNITED STATES PATENT OFFICE
CERTIFICATE OF CORRECTION

Patent No. 3,391,221                                               July 2, 1968

Wilbert Lee Gore et al.

It is certified that error appears in the above identified patent and that said Letters Patent are hereby corrected as shown below:

Column 1, line 13, "imporved" should read -- improved --.
Column 3, lines 21 and 22, "polying" should read -- polymer is readily available in powder form suited for blending --.

Signed and sealed this 10th day of February 1970.

(SEAL)
Attest:

Edward M. Fletcher, Jr.                                   WILLIAM E. SCHUYLER, JR.
Attesting Officer                                                    Commissioner of Patents